A. B. HOLLEY.
SAD IRON HEATER.
APPLICATION FILED MAR. 23, 1912.
1,037,251.
Patented Sept. 3, 1912.
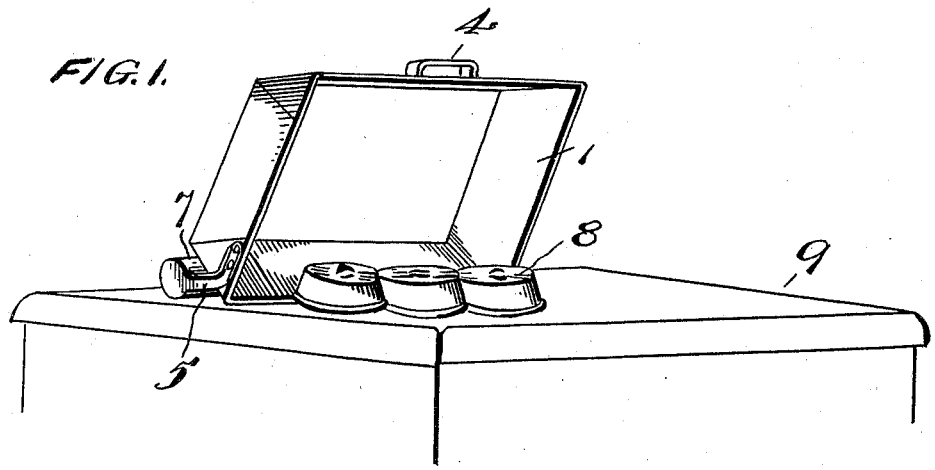
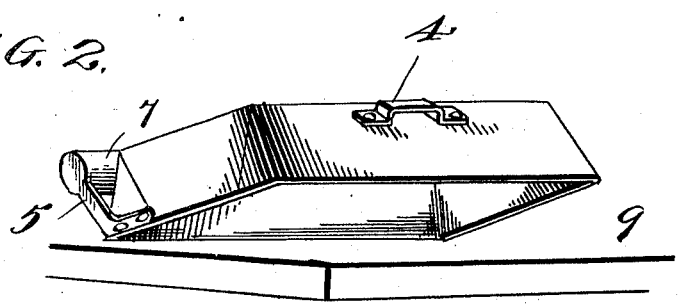
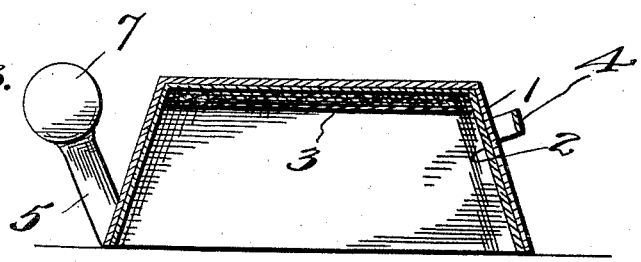
WITNESSES
C. K. Davies
H. A. Phillips
INVENTOR
Albert B. Holley
By Thomas R. Harney, Attorney

UNITED STATES PATENT OFFICE.

ALBERT B. HOLLEY, OF VIRGINIA, MINNESOTA.

SAD-IRON HEATER.

1,037,251.

Specification of Letters Patent.

Patented Sept. 3, 1912.

Application filed March 23, 1912. Serial No. 685,746.

*To all whom it may concern:*

Be it known that I, ALBERT B. HOLLEY, a citizen of the United States, residing at Virginia, in the county of St. Louis and State of Minnesota, have invented certain new and useful Improvements in Sad-Iron Heaters, of which the following is a specification.

The present invention relates to improvements in said iron heaters, and is designed primarily for the purpose of hastening the heating of sad irons and the like.

The object of the invention is the provision of a suitable utensil or implement to be used in connection with heating stoves, either gas or coal burning, or other fuel burning stoves, upon which flat irons or sad irons are placed to be heated.

A meritorious feature and advantage of the invention consists in the facility with which the retainer or cover may be manipulated while covering or uncovering the irons. And a further object attained by my invention is the simplicity of construction and operation of the device, which, together with its durability and adaptation for manifold uses as a utensil, renders the device especially valuable in household connections.

The invention, broadly stated, consists in a retainer or cover, for this purpose, whose equilibrium is so adjusted that the device may be lifted from the surface upon which it rests, usually a stove top, using the rear edge as a pivot point, and returned to the stove top, quickly and with facility.

The accompanying drawings illustrate my invention constructed according to the best mode I have so far devised for the practical application of the principles.

Figures 1 and 2 respectively, illustrate the invention in a retainer, wholly open and partially open, and resting on a stove top, and Fig. 3 is a vertical central sectional view of a utensil embodying the invention.

In the preferred embodiment of my invention as illustrated in the drawings I employ a metallic vessel 1, which may be an inverted pan of sheet metal and of usual construction, but is interiorly lined with a material which is a non-conductor of heat, as 2, and preferably has a heat reflector secured within the top of the pan as indicated at 3. A non-conducting material 2′ may be interposed between the reflector and the upper wall of the pan, so that the heat is not only reflected in the pan, but its passage through the upper wall of the pan is retarded by the non-conducting material. At its front the pan is provided with a handle 4.

To each of the lower rear corners of the pan or vessel is attached an angle iron 5, and each of these angle irons has cast integral therewith a weight 7, cylindrical in cross section, and of suitable length to be determined. These weights 7 are so adjusted with relation to the weight of the retainer or pan 1, that the retainer may be lifted from the stove top 9 upon which the irons 8 are resting, by application of power to the handle 4.

The retainer is usually lifted by a person holding an iron and applying the nose of the iron to the handle 4. The forward part of the retainer is lifted as in Fig. 2, and turned backward until the position of Fig. 1 is reached, wherein the weights 7 are illustrated as resting on the stove top.

In lifting or turning back the retainer, the axis of movement of pivot point is the rear edge of the retainer which edge is in continuous contact with the stove top, and the relationship between the weight of the pan and the weights 7 is so closely adjusted that the pan is made to swing on its pivot edge freely, either backward or forward.

While the irons are inclosed within the retainer, the heat arising from the stove is retained in the pan by the non-conducting linings, and reflected by the heat reflector in the upper part of the retainer. In this manner a saving in heat is accomplished, and the irons may be heated at a reduced expenditure of coal or other fuel.

The retainer may of course be used for other purposes to which it is adapted, and may be manipulated in manner other than that indicated hereinbefore, but in any event the device is so constructed that the weights or counterbalances are sufficient, when the front of the retainer is partly raised from the heating surface, to tilt the pan backwardly to permit access to the irons, the rear edge of the retainer being the center of gravity of the device. The weights have the additional function of a stop whereby the opening movement of the receptacle is limited and whereby the receptacle is held in an open or tilted position.

Having thus fully described my invention, what I claim as new and desire to secure by Letters Patent is:—

1. An inverted receptacle having an arm projecting therefrom and a counterbalancing weight on the arm, the edge of the receptacle adjacent said weight acting as a pivot and the weight forming a stop to limit opening movement of the receptacle, and whereby the receptacle is held in tilted position.

2. A cover having a handle attached at its front and arms projecting from its rear each having a counterbalancing weight thereon, whereby the front of the receptacle may be tilted back on its rear edge as a pivot, said weights acting as a stop to limit the opening movement of the receptacle.

In testimony whereof I affix my signature in presence of two witnesses.

ALBERT B. HOLLEY.

Witnesses:
J. G. McCarthy,
G. E. L. Veque.

Copies of this patent may be obtained for five cents each, by addressing the "Commissioner of Patents, Washington, D. C."